Dec. 31, 1963  O. A. KINZIE ETAL  3,115,906
GREASE DISPENSING APPARATUS
Filed May 13, 1960  4 Sheets-Sheet 1

INVENTORS
ORA A. KINZIE
HUBERT J. WATTS
BY
ATTORNEY

INVENTOR.
ORA A. KINZIE
HUBERT J. WATTS

BY

ATTORNEY

United States Patent Office 3,115,906
Patented Dec. 31, 1963

3,115,906
GREASE DISPENSING APPARATUS
Ora A. Kinzie and Hubert J. Watts, Ponca City, Okla., assignors to Continental Oil Company, Ponca City, Okla., a corporation of Delaware
Filed May 13, 1960, Ser. No. 28,953
11 Claims. (Cl. 141—253)

This invention relates to apparatus for dispensing a viscous material. More particularly, but not by way of limitation, the present invention relates to an apparatus for automatically dispensing a precise amount of grease to a container.

Devices for dispensing heavy viscous materials such as lubricating grease are well known and widely used in industry. Such devices have generally been of relatively heavy and complicated construction, and the power equipment required to force the viscous grease from the dispensing device frequently has limited the operating locale of such devices to plants or stations having a source of high pressure fluid. Moreover, such machines have often been incapable of delivering a precise amount of grease to a container to be filled and, in delivering the grease to the container, have failed to adequately eliminate entrapped air from the grease in the container.

The present invention contemplates a grease dispensing device which is completely automatic in operation, is hydro-pneumatically actuated, and which is portable so that it may be easily moved by one person from one location to another. The grease dispensing device of this invention comprises a pneumatic grease dispensing apparatus in combination with a closed hydraulic system for lifting a container to be filled with the grease into position adjacent a dispensing nozzle. The movement of the container to and from its grease receiving position is correlated with the rate of grease dispensation in a manner which assures the most efficient filling of the container. The closed hydraulic system is driven from the pneumatically actuated dispensing system through an interconnecting mechanical linkage. This arrangement permits the grease dispensing device of the present invention to be utilized at any location where there is low pressure air and electrical power available. Since a supply of low pressure air is generally available in most industrial installations, this feature constitutes a particularly advantageous aspect of the present invention.

The grease dispensing device of the present invention is characterized further in that its electrical circuitry assures that no grease will be dispensed until an unfilled container is placed in the proper position for receiving grease from the dispensing nozzle of the device. It will be apparent that this feature of the invention assures economy of operation and also assures that no residual grease will be left by the dispensing apparatus at points where it might constitute a safety hazard. Moreover, the double-acting, pneumatically actuated cylinder which is utilized to force the grease from a dispensing nozzle when a container is placed thereunder may be adjusted in its length of stroke to permit any desired amount of grease to be delivered from the dispensing nozzle.

It is an object of the present invention to provide a hydro-pneumatically operated grease dispensing device which requires only a source of low pressure air and low electrical voltage for its operation.

Another object of the present invention is to provide a hydro-pneumatic grease dispensing device in which the amount of grease which is dispensed upon each actuation of the device may be accurately controlled as desired.

A further object of the present invention is to provide a hydro-pneumatically operated grease dispensing device which is relatively simple in construction and which is portable to permit movement by a single person from one operating location to another.

An additional object of the present invention is to provide a hydro-pneumatically operated grease dispensing device which will deliver a precise quantity of grease to a container to be filled only when the container is in the proper position beneath the grease dispensing nozzle of the device.

Yet another object of this invention is to provide a grease dispensing device which is relatively inexpensive to construct and which has a long and trouble-free service life.

These and other objects and advantages of the invention will be evident from the following detailed description, when read in conjunction with the accompanying drawings which illustrate our invention.

Figure 5A:
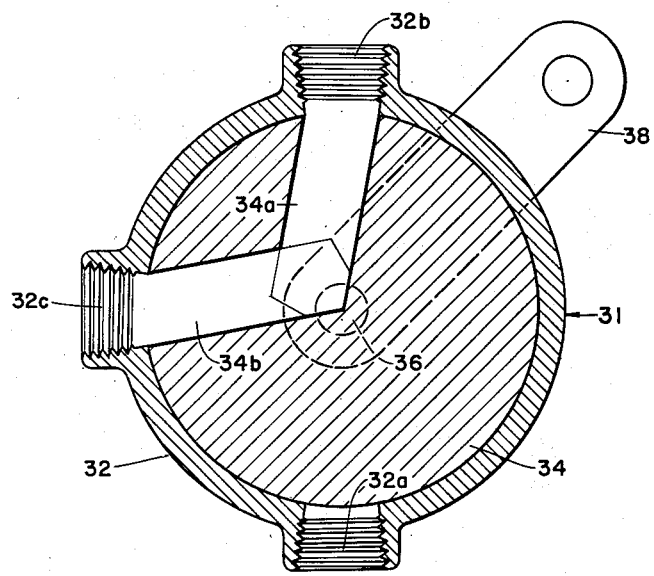
Figure 5B:
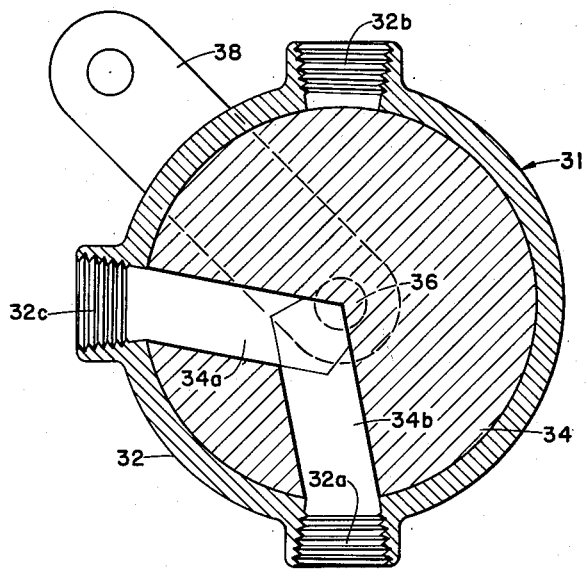

FIGURES 5a and 5b are enlarged vertical sectional views taken through the center of the rotary valve utilized in the grease dispensing device of this invention, and illustrating, in FIG. 5a, the position of the rotary valve when grease is being delivered from a reservoir or other source to the grease cylinder of this invention. FIG. 5b illustrates the position of the rotary valve when grease is being delivered from the grease cylinder to the dispensing nozzle of the invention.

Figure 1:
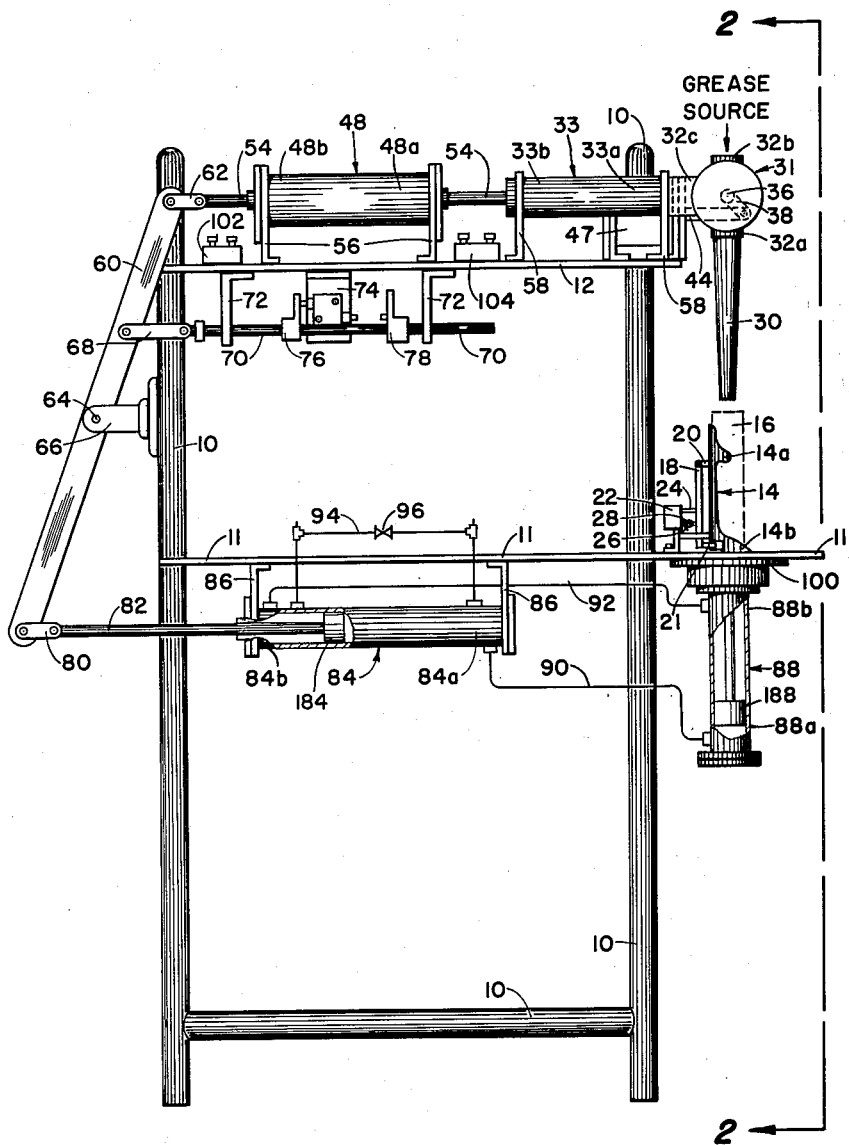
FIGURE 1 is a side elevational view of the grease dispensing device of the present invention illustrating the mechanical portions of the apparatus.

Referring to the drawings in detail, and particularly to FIG. 1, reference character 10 generally designates an upright framework which carries a horizontal base plate 11 approximately midway between its top and bottom, and a horizontal support plate 12 near its top. Reference character 14 generally designates a container support member having arm portions 14a adapted to extend partially around a container and frictionally grip the same. Foot portions 14b are disposed at the lower end of the support member 14 to maintain the container in proper alignment. A container 16, such as a grease gun cartridge, is illustrated in dashed lines as it rests in the support member 14 at the initial instant of actuation of the dispensing device. A bar 18 extends parallel to the support member 14 and is spaced from the rear side thereof. The bar 18 is pivotally connected at its upper end to a projection 20 which is attached to the rear side of the support member 14. At the lower end of the bar 18, an integral toe 21 projects normally therefrom through an aperture at the base of the support member 14.

A ratchet relay type switch 22 is mounted in spaced relation from the bar 18, and guides 24 are carried by the switch 22 at opposite sides of the bar 18. A spring-loaded lever 26 projects from the side of the switch 22 which faces the bar 18, and cooperates, during certain phases of the operation of the dispensing device, with a roller 28 which is rotatably mounted on the rear side of bar 18.

A dispensing nozzle 30 is disposed immediately above the support member 14 in spaced relation therefrom. A three-way rotary valve 31 is connected at one of its ports 32a to the discharge nozzle 30, at a second of its ports 32b to a source of grease (not shown), such as a kettle or reservoir, and at its third port 32c to the forward end 33a of a grease cylinder 33. As shown in FIGS. 5a and 5b, the rotatable core 34 of the three-way rotary valve has a pair of communicating radial bores 34a and 34b, and is connected through shaft 36 to one end of an arm 38. The arm 38 is connected at its other end to a piston rod 44 which is connected to a piston 46 (see FIG. 4) located in a valve operating cylinder 47. For convenience of description, the end of valve operating cylinder 47 through which the piston rod 44 passes will be termed the forward end of the cylinder and will be designated by reference character 47a. Its opposite end will be termed the rear end of the cylinder and will be designated by reference character 47b.

A power cylinder 48 is horizontally aligned with, and is spaced from, the grease cylinder 33. The power cylinder 48 has front and rear ends 48a and 48b respectively. Pistons 50 and 52, located in the power cylinder 48 and the grease cylinder 33, respectively, are interconnected by a common piston rod 54 which extends through piston 50 and out of the rear end 48b of power cylinder 48. The power cylinder 48 and grease cylinder 33 are rigidly secured (FIG. 1) by mounting brackets 56 and 58, respectively, to horizontal support plate 12.

The piston rod 54 is connected at its end extending from the rear end 48b of power cylinder 48 to one end of a pivoted rocker arm 60 through an interconnecting linking member 62. The pivoted rocker arm 60 is pivoted intermediate its length about a pivot pin 64 which is journaled in a support bracket 66 projecting from the side of frame 10. A linking member 68 is pivotally connected at one of its ends to the pivoted rocker arm 60 between the points of connection thereto of pivot pin 64 and linking member 62 and is attached at its other end to a shaft 70. The shaft 70 is slidably journaled in two support brackets 72 which depend from the under side of the horizontal support plate 12 and in a three-way switch 74 which is also mounted on the under side of plate 12 and projects downwardly therefrom. Disposed upon either side of the switch 74 and fixedly mounted upon shaft 70 are a pair of contacts 76 and 78 which are adapted to engage the contact elements of switch 74 as shaft 70 reciprocates, all in a manner which will be more fully explained hereinafter.

The lower end of the pivoted rocker arm 60 is connected through a linking member 80 to a piston rod 82 which is attached to piston 184 located in a hydraulic timing cylinder 84. The hydraulic timing cylinder 84 is suspended below the horizontal base plate 11 by means of a pair of brackets 86 and is connected from its forward end 84a to the lower end 88a of a vertically mounted hydraulic lift cylinder 88 by means of a conduit 90. The rear end 84b of the timing cylinder 84 is connected via conduit 92 to the upper end 88b of the lift cylinder 88. A bypass line 94 is connected between the ends 88a and 88b of the timing cylinder 88 and contains a damping valve 96 which is disposed approximately midway of its length. The piston 188 of the lift cylinder 88 is connected to a horizontal plate 100 which supports, and is secured to, the support member 14. It should also be noted that the plate 100 moves through a mating aperture (not shown) in the base plate 11.

Figure 2:
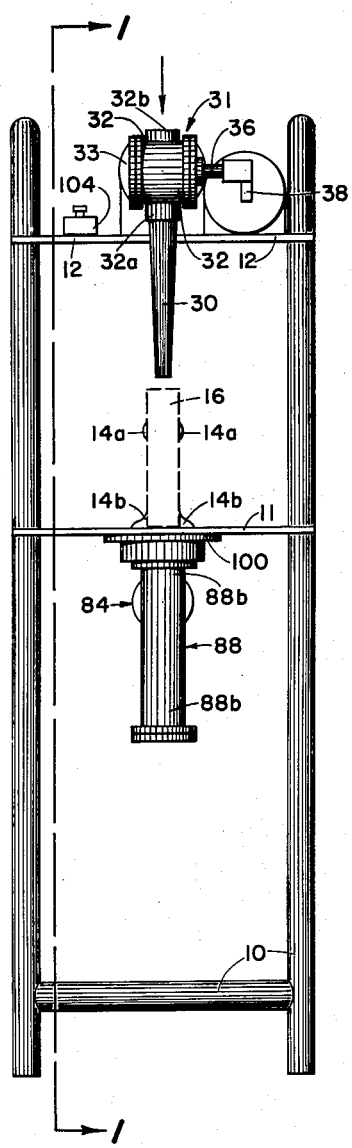
FIGURE 2 is a front elevational view of the device depicted in FIG. 1 as the operator views the device at the instant of inserting in the device a container to be filled with grease.
Figure 3:
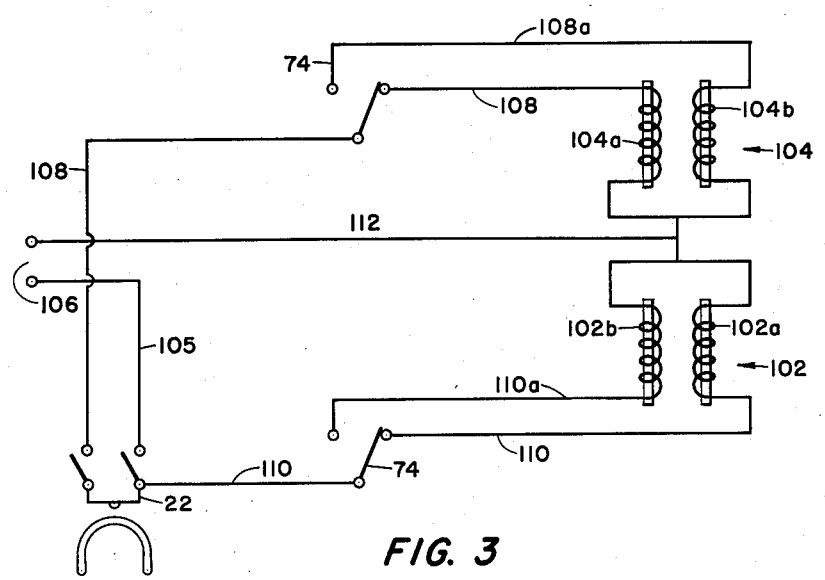
FIGURE 3 is a schematic wiring diagram illustrating the electrical circuit comprising a portion of the present invention.
Figure 4:
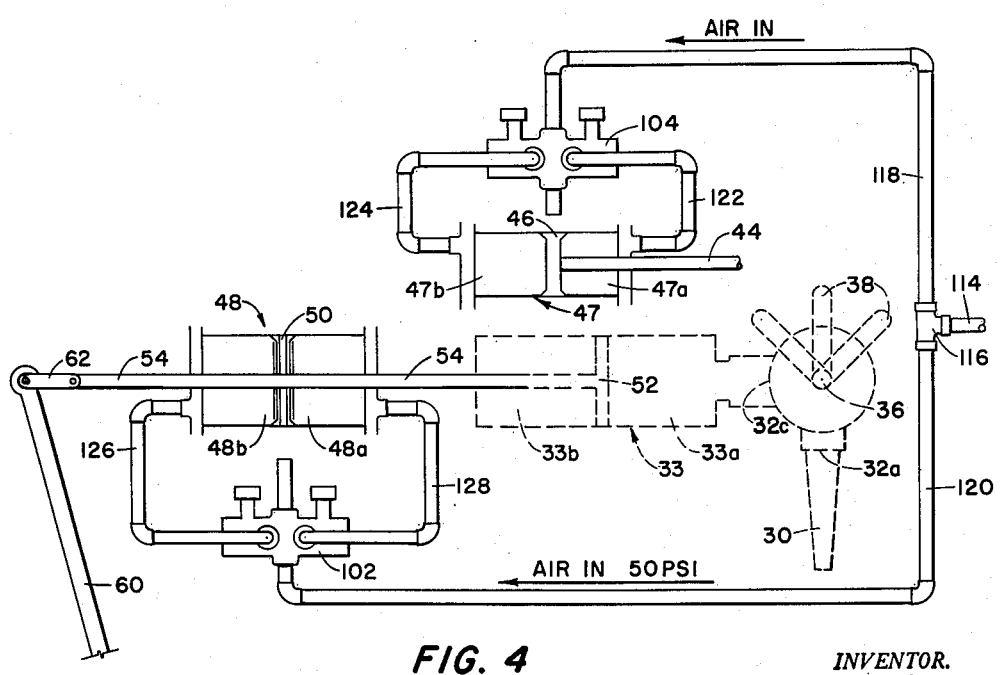
FIGURE 4 is a flow diagram illustrating the flow of low pressure air as it is utilized in the present invention.

In the description of FIGS. 1 and 2, reference to the elements of the present invention which are designated by reference numerals 102 and 104 has purposely been omitted since it is felt that these elements, which are in each case four-way solenoid air valves, can be more clearly described in conjunction with the description of FIGS. 3 and 4 which respectively illustrate the electrical circuitry and the pneumatic system of the present invention. As shown in FIG. 3, the electrical circuit which is employed includes a two-way ratchet relay switch 22 of the type, for example, which is sold by the Potter and Brumfield Corporation of Princeton, Indiana, under the designation "AP Series Ratchet Relay Switch—Type AP11A– 115 Volts." The switch is connected from one of its terminals through electrical lead 105 to a source of electromotive force 106. From a second of its terminals the switch 22 is connected through lead 108 and the three-way switch 74 to one of the coils 104a of four-way solenoid valve 104. The third terminal of switch 22 is connected via lead 110 through three-way switch 74 to one coil 102a of the four-way solenoid valve 102. Electrical lead 112 is connected between the source of electromotive force 106 and each of the four-way valves 104 and 102 in the manner disclosed in FIG. 3. The second coil 104b of four-way valve 104 is connected by lead 108a to the second terminal of three-way switch 74 which is also connected via lead 110a to the second coil 102b of four-way valve 102.

The path of flow of low pressure air through the air actuated elements of the present invention is shown in FIG. 4. Air enters the system from a source of compressed air via conduit 114. The flow of air is divided through a T 116 with a portion of the air entering conduit 118 and a portion entering conduit 120. The air in conduit 118 is directed to four-way valve 104. Depending upon the state of actuation of four-way valve 104, the air which enters the valve via conduit 118 will be directed by the valve into either conduit 122 or conduit 124. Consequently, depending upon the state of actuation of valve 104, the compressed air will enter one of the two ends 47a or 47b of valve operating cylinder 47 and the piston 46 will be reciprocated accordingly.

The air which passes through conduit 120 enters the four-way valve 102 and from thence will be directed via one of the conduits 126 or 128 to one of the ends 48a or 48b of power cylinder 48, depending upon the state of actuation of the valve. Elements which are indicated in dashed lines in FIG. 4 may not properly be considered a portion of the compressed air system of the present invention since they are not directly actuated by compressed air, but they have been included in the air flow diagram depicted in FIG. 4 for the purpose of more clearly explaining the relationship of these elements to the four-way valves, 102 and 104, the power cylinder 48 and valve operating cylinder 47. The manner in which the compressed air supply is utilized to actuate the elements illustrated in dashed lines in FIG. 4 will be discussed in greater detail in conjunction with the description of the operation of the grease dispensing apparatus as a whole.

FIGS. 5a and 5b illustrate in detail the construction and mode of operation of the three-way rotary valve 31. The valve 31 comprises an axially-bored cylindrical valve body 32 which has three ports 32a, 32b and 32c communicating with the bore of the valve body and spaced substantially 90° from each other around the periphery of the valve. A valve core 34 having an outside diameter substantially equal to the inside diameter of the valve body 32 is slidingly fitted in the valve body for rotation therein. The core defines a pair of substantially radially extending bores 34a and 34b which are in communication with each other near the center of the core. A shaft 36 is coaxially connected at one of its ends to the center of the core 34 and projects outwardly therefrom along the axis of rotation of the core. At its other end, the shaft 36 is connected to one end of a crank arm 38 which, as illustrated in dashed lines in FIG. 1, is connected at its other end to one end of the piston rod 44 of valve operating cylinder 47.

In FIG. 5a, the valve core 34 has been rotated to a position such that its radial bores 34a and 34b communicate with ports 32b and 32c, respectively, of the valve body 32. In this position of the valve 31, grease under pressure is directed from an appropriate grease source, such as a kettle or reservoir, into grease cylinder 33 via the three-way rotary valve. When the piston 46 of the valve operating cylinder 47 moves toward the rear end 47b of the cylinder, the three-way rotary valve 31 will be shifted from the position shown in FIG. 5a to the position shown in FIG. 5b. In the latter position, the radial bores of 34a and 34b of the valve core 34 are placed in communication with ports 32c and 32a, respectively, so that grease may be directed from grease cylinder 33 via the rotary valve 31 to the filling nozzle 30.

*Operation*

In explaining the operation of the grease dispensing device of the present invention, general reference will be made to the entire device as depicted in FIG. 1, with specific reference being made to the electrical and pneumatic components illustrated in FIGS. 3 and 4 as the necessity for clarity may dictate. Prior to the insertion of a container 16 in the support member 14, the switch 22 is open so that no current flows through the solenoid coils of either of the four-way valves 102 and 104. Thus the power cylinder 48 and the valve operating cylinder 47 remain inactivated. To commence the operation of the grease dispensing device, an operator places an empty container 16 in the support member 14 in the position shown in dashed lines in FIG. 1. In this position, the container 16 pushes against the toe 21 of bar 18 and thereby biases the bar 18 towards the switch 22. The roller 28 carried by bar 18 presses against the spring-loaded lever 26 of the switch 22 to actuate the ratchet mechanism (not shown) of the switch and close the electrical circuit depicted in FIG. 3.

Upon closure of the electrical circuit, the solenoid coil 104a of four-way valve 104 is energized, thereby causing the four-way valve 104 to move to a position which allows compressed air to pass via conduit 124 into the rear end 47b of valve operating cylinder 47. The air which is thus admitted to valve operating cylinder 47 acts upon piston 46 to extend piston rod 44 outwardly from the cylinder 47. This actuation in turn rotates the valve core 34 by means of connecting arm 38 so that the radial bores 34a and 34b are brought into communication with ports 32b and 32c, respectively (see FIG. 5a). When the core of the rotary valve 31 is in this position, grease is forced under pressure from an appropriate source through the radial bores 34a and 34b and into grease cylinder 33.

Simultaneously with the energization of the coil 104a of the four-way valve 104 upon the closure of the switch 22, the coil 102a of four way valve 102 is also energized. This causes the valve to shift over to permit compressed air to pass via conduit 128 into the forward end 48a of the power cylinder 48. The injection of compressed air into the forward end 48a of the power cylinder 48 causes the piston 50 located therein to move toward the rear end 48b of the power cylinder, carrying with it the piston rod 54. This movement of the piston rod 54 causes the piston 52 which is located in grease cylinder 33 to move to the rear end 33b thereof, thus allowing the cylinder 33 to be filled with grease. As the piston rod 54 is extended outwardly from the rear end 48b of power cylinder 48, the upper end of the pivoted rocker arm 60 is also pushed outwardly away from the cylinder 48. Simultaneously, the lower end of the rocker arm 60 moves inwardly toward the timing cylinder 84, pushing the piston rod 82 ahead of it into the timing cylinder.

The timing cylinder 84, in conjunction with the lift cylinder 88 and their connecting conduits 90 and 92, constitutes a hydraulically closed system whereby, upon the movement of the piston rod 82 and its associated piston into the timing cylinder 84, hydraulic fluid is forced via conduit 90 into the lower portion 88a of the lift cylinder 88 to force the plate 100, the support member 14, and the container 16 upwardly. In this manner the unfilled container 16 is lifted vertically until the end of the dispensing nozzle 30 is disposed adjacent the bottom of the container.

As the piston 50 and its associated piston rod 54 are moved toward the rear end 48b of the power cylinder 48, the shaft 70 is reciprocated so as to bring the contact 78 into engagement with cooperating contacts of the three-way switch 74. Upon the switching of the switch 74, the coils 102b and 104b in four-way valves 102 and 104, respectively, which have not previously been energized, are placed in the electrical circuit and become energized while the coils 102a and 104a which were initially energized are disconnected from the circuit. With the energization of the coil 104b, the four-way valve 104 shifts over to direct compressed air via conduit 122 to the front end 47a of the valve operating cylinder 47. This, in turn, forces piston 46 to the rear of the valve operating cylinder 47 and thereby causes the core 34 of three-way rotary valve 31 to be rotated to a position in which the radial bores 34a and 34b of the core 34 are placed in communication with the ports 32c and 32a, respectively. In this position, communication through the valve 31 is established between the grease cylinder 33 and the dispensing nozzle 30. Simultaneously with the actuation of the rotary valve 31 just described, four-way valve 102 is shifted over to permit compressed air to pass via conduit 126 to the rear end 48b of power cylinder 48. The piston 50 is then driven toward the forward end 48a of the power cylinder 48 and in turn drives the piston 52 toward the forward end 33a of the grease cylinder 33. As the piston 52 moves forward in the grease cylinder 33, it forces the grease contained therein through the rotary valve 31 and into the dispensing nozzle 30. The grease is discharged from the nozzle 30 at its lower end which, as has been previously indicated, is adjacent the bottom of the container 16 at the initial instant of discharge. However, as the piston 50 in the power cylinder 48 commences its movement toward the forward end of the cylinder, the pivoted rocker arm 60 is pivoted about pivot pin 64 to cause the piston rod 82 and its associated piston (not shown) to move toward the rear end 84b of timing cylinder 84. This in turn forces the piston of the lifting cylinder 88 toward the lower end 88a of the cylinder, thereby causing the plate 100 and the container 16 carried thereon to be lowered from around the dispensing nozzle 30. By appropriate adjustments of the length of stroke of the several pistons within their respective cylinders and of the mechanical linkage connecting the pneumatic system with the hydraulic system, a desirable correlation may be obtained between the rate of downward movement of the container 16 and the rate of filling of the container by the grease discharged from the dispensing nozzle 30. Since the end of the dispensing nozzle 30 is initially disposed adjacent the bottom of the container 16, and the container is moved downward only so fast as it becomes filled, it will be apparent that there is little opportunity for air to become entrapped in the grease as it is deposited in the container. It is, of course, necessary that the relative sizes of the valve operating cylinder 47 and the power cylinder 48 be such that the three-way rotary valve 32 will be shifted over rapidly as compared to the speed of movement of the piston 50 in the power cylinder 48. Otherwise, the radial bores 34a and 34b of the core 34 of the rotary valve 31 would not be placed in communication with the ports 32c and 32a before dangerous excessive pressure was developed in the grease cylinder 33 by actuation of the power cylinder 48.

As the piston 50 continues to move forward in the power cylinder 48, the piston of the lift cylinder 88 continues to be forced downwardly, carrying with it the plate 100, support member 14, and the container 16, which continues to be filled as it moves downwardly. As the support member 14 and container 16 reassume the position which they occupied at the start of the dispensing operation, as shown in FIGS. 1 and 2, the roller 28 carried by the bar 18 will press against the spring-loaded lever 26 of the ratchet switch 22. This pressure on the spring-loaded lever 26 opens the switch 22, thereby deenergizing all solenoids of the four-way valves 102 and 104 and rendering the pneumatic system completely inoperative. The mechanism of the ratchet relay switch 22 is such that before the switch can be reclosed to commence another operating cycle of the dispensing device, the filled container 16 must be removed and an empty container placed in position against the support member 14. This feature assures that no grease will be emitted from the dispensing nozzle 30 except when the end of the nozzle is projecting down inside an empty, or partially empty, container which is to be filled.

If it should be desired to vary the size of container which will be filled by the dispensing device, and therefore the amount of grease which is delivered via the dispensing nozzle 30 upon each dispensing cycle, this may be easily accomplished by merely adjusting the contacts 76 and 78 in their axial spacing along shaft 79 so that the period of reciprocation of the pistons in the power cylinder 48 and the valve operating cylinder 47 is decreased or increased, as may be required.

Bypass line 94 and the damping valve 96 have been connected to opposite ends of the timing cylinder 84 for the purpose of cushioning the stroke of the piston in the lifting cylinder 83 at its upper and lower limits of movement. In this way, the container 16 will not be jarred or bounced upwardly as it reaches the filling position around the nozzle 30 and, conversely, will be lowered smoothly and gently to its original position as depicted in FIGS. 1 and 2 after it has been filled.

From the foregoing it will be apparent that the present invention provides a novel mechanism which will dispense a precise amount of grease upon each operation of the mechanism. Moreover, such dispensation will occur only when an empty container is in a position to receive the grease. It will also be apparent that the dispensing device of this invention is fully automatic in operation and may be easily adjusted to deliver any quantity of grease which may be desired.

Changes may be made in the combination and arrangement of parts or elements as heretofore set forth in the specification and shown in the drawings, it being understood that changes may be made in the precise embodiment disclosed without departing from the spirit and scope of the invention as defined in the following claims.

We claim:

1. Apparatus for dispensing grease or the like into a container, comprising a double-acting pneumatic ram system, a vertically supported nozzle, a vertically movable container support member for moving the container up around the nozzle and down below the nozzle, a pair of hydraulic rams interconnected in a closed hydraulic system, said support member being connected to one of said hydraulic rams, a mechanical linkage connecting the pneumatic ram system to the other of said hydraulic rams for raising said support member upon actuation of the pneumatic ram system in one direction and for lowering said support member upon actuation of the pneumatic ram system in the opposite direction, and grease filling means connected to the pneumatic ram system and said nozzle for dispensing a precise amount of grease through said nozzle upon actuation of the pneumatic ram system in said opposite direction.

2. Apparatus for dispensing grease or the like into a container, comprising a power cylinder, a piston reciprocally disposed in the power cylinder for movement in opposite directions in the power cylinder, an air supply, valve means interconnecting the air supply to the opposite ends of the power cylinder for alternately supplying air to the opposite ends of the power cylinder and reciprocating said piston, a nozzle having an inlet end and an outlet end, means supporting the nozzle vertically with the outlet end thereof extending downwardly, grease filling means connected to said piston and nozzle inlet end for discharging a precise amount of grease through the nozzle when said piston is moved in one direction, a container support member, a hydraulic ram system supporting the container support member in alignment with the nozzle for alternately raising a container supported on the support member up over the nozzle and lowering the container below the nozzle, and a mechanical linkage connected to said piston and the hydraulic ram system for lowering the support member when said piston is moved in said one direction and for raising the support member when said piston is moved in an opposite direction.

3. Apparatus as defined in claim 2 wherein said grease filling means includes a grease cylinder; a piston reciprocally disposed in the grease cylinder and connected to the piston in the power cylinder for simultaneous reciprocation with the piston in the power cylinder; a grease supply, and a rotary valve connected to one end of the grease cylinder and the grease supply and the inlet end of the nozzle for directing grease from the grease supply into the grease cylinder and, alternately, from the grease cylinder into the nozzle.

4. Apparatus as defined in claim 3 characterized further to include a valve operating cylinder, valve means connecting the air supply to opposite ends of the valve operating cylinder, a piston in the valve operating cylinder responsive to pressure differentials in the respective cylinder for reciprocation, means connecting the valve operating cylinder piston to said rotary valve for operation of said valve in response to movement of said piston, and control means connected to both of said valve means for operation of said rotary valve in timed relation to operation of said power cylinder piston.

5. Apparatus as defined in claim 1 wherein said grease filling means includes valve means controlling the times of discharge of grease through the nozzle, separate solenoids connected to both of said valve means, and an electrical circuit connected to said solenoids for operating said valve means in timed relation, said circuit including a switch adjacent the container support member responsive to the presence of a container on said support member, and switch means responsive to movement of said mechanical linkage.

6. Apparatus as defined in claim 2 wherein said hydraulic ram system includes a pair of hydraulic rams connected in a closed hydraulic system, one of said rams being connected to said container support member and the other of said rams being connected to said mechanical linkage.

7. Apparatus as defined in claim 2 wherein said hydraulic ram system comprises a pair of cylinders, conduits connecting one end of one of said cylinders with one end of the other cylinder and connecting the other end of said one cylinder with the opposite end of said other cylinder, a piston reciprocally disposed in each of said cylinders, one of said pistons being connected to said container support member and the other of said pistons being connected to said mechanical linkage.

8. Apparatus as defined in claim 7 characterized further to include a valve in said hydraulic ram system for controlling the rate of movement of said hydraulic system pistons.

9. Apparatus as defined in claim 7 characterized further to include a bypass conduit connected to the opposite ends of one of said hydraulic cylinders, and a valve in said bypass conduit for controlling the the rates of movement of said hydraulic cylinder pistons.

10. Apparatus for dispensing a precise amount of grease or the like into a container, comprising a grease supply, a grease cylinder, a piston reciprocally disposed in the grease cylinder, a dispensing nozzle having an inlet end and an outlet end, rotary valve means interconnecting the grease supply and the inlet end of the nozzle to one end of the grease cylinder for directing grease from the grease supply into the grease cylinder and from the grease cylinder into the nozzle upon reciprocation of the piston in the grease cylinder, means supporting the nozzle vertically with the outlet end thereof extending downwardly, a power ram connected to the grease cylinder piston, a timing cylinder, a piston in the timing cylinder, linkage connecting the power ram to the timing cylinder piston for reciprocation of said timing cylinder piston upon operation of said ram, a vertically extending lifting cylinder having its opposite ends connected to the opposite ends of the timing cylinder, a piston in the lifting cylinder, liquid in the timing and lifting cylinders for raising and lowering the piston in the lifting cylinder upon movement of the timing cylinder piston in opposite directions, said lifting cylinder being supported underneath the dispensing nozzle, means for supporting the container to be filled on the lifting cylinder piston for raising the container over the nozzle and lowering the container from around the nozzle upon raising and lowering of said lifting cylinder piston, and means for operating the power ram and said valve means to inject grease into the grease cylinder while raising the container over the nozzle and for injecting grease from the grease cylinder through the nozzle as the container is lowered.

11. Apparatus for dispensing a viscous material into a container comprising a fluid driven, double-acting power cylinder having a piston therein and a piston rod projecting from the opposite ends thereof; means for alternately supplying power fluid to the opposite ends of said power cylinder; a nozzle for dispensing said viscous material into said container; an injection cylinder for injecting viscous material into said nozzle; a piston in said injection cylinder drivingly connected to the piston of said power cylinder; a source of said viscous material; valve means connected between said injection cylinder, said source of viscous material and said nozzle and connected to, and synchronously responsive to, said means for alternately supplying power fluid to said power cylinder to supply said viscous material to said injection cylinder when power fluid is supplied to one end of said double-acting power cylinder, and to interconnect said injection cylinder with said nozzle when power fluid is supplied to the other end of said double-acting power cylinder; a container support member; a hydraulic ram system supporting the container support member in alignment with the nozzle for alternately raising a container supported on the support member up over the nozzle and lowering the container below the nozzle; and a mechanical linkage connected to the piston rod projecting from one end of said fluid driven double-acting power cylinder and to the hydraulic ram system for actuating the hydraulic ram system to raise said support member when said power cylinder is actuated by power fluid supplied to said one end thereof, and for actuating the hydraulic ram system to lower said support member when said power cylinder is actuated by power fluid supplied to said other end thereof.

References Cited in the file of this patent
UNITED STATES PATENTS

| | | |
|---|---|---|
| 1,499,338 | Bond | July 1, 1924 |
| 1,961,465 | Thompson | June 5, 1934 |
| 2,103,813 | Johnson | Dec. 28, 1937 |
| 2,586,915 | Cate | Feb. 26, 1952 |
| 3,023,791 | Strain | Mar. 6, 1962 |

FOREIGN PATENTS

| | | |
|---|---|---|
| 527,972 | Belgium | Apr. 30, 1954 |